United States Patent
Patil et al.

(10) Patent No.: US 9,043,826 B1
(45) Date of Patent: May 26, 2015

(54) USER BASED PARENTAL CONTROLS

(71) Applicant: Cox Communications, Inc., Atlanta, GA (US)

(72) Inventors: Anant Pralhad Patil, Marietta, GA (US); Yousef Wasef Nijim, Roswell, GA (US); Lisa A. Pickelsimer, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 13/656,276

(22) Filed: Oct. 19, 2012

(51) Int. Cl.
| | |
|---|---|
| *H04N 21/258* | (2011.01) |
| *H04N 21/254* | (2011.01) |
| *H04N 21/418* | (2011.01) |
| *H04N 21/40* | (2011.01) |
| *H04N 21/25* | (2011.01) |

(52) U.S. Cl.
CPC .......... *H04N 21/25891* (2013.01); *H04N 21/25* (2013.01); *H04N 21/254* (2013.01); *H04N 21/2541* (2013.01); *H04N 21/418* (2013.01); *H04N 21/4182* (2013.01); *H04N 21/25875* (2013.01); *H04N 21/25816* (2013.01); *H04N 21/4181* (2013.01); *H04N 21/258* (2013.01); *H04N 21/25808* (2013.01); *H04N 21/40* (2013.01); *H04N 21/25866* (2013.01)

(58) Field of Classification Search
CPC ............ H04N 21/2668; H04N 21/442; H04N 21/44222; H04N 21/4755; H04N 21/4532; H04N 21/466; H04N 21/4661
USPC .......................................................... 725/30
See application file for complete search history.

(56) References Cited

U.S. PATENT DOCUMENTS

| | | | | |
|---|---|---|---|---|
| 5,758,258 | A  * | 5/1998 | Shoff et al. ................... | 725/116 |
| 8,079,044 | B1 * | 12/2011 | Craner ............................ | 725/28 |
| 2010/0107185 | A1* | 4/2010 | Shintani ......................... | 725/25 |

* cited by examiner

*Primary Examiner* — Justin Shepard
(74) *Attorney, Agent, or Firm* — Merchant & Gould P.C.

(57) ABSTRACT

User-based parental controls (UBPC) are provided. UBPC are provided to users according to a user profile associated with a specific user. Parental controls may be tailored to meet a parental control need according to each user. User profiles may be created by one or more administrative users and may include restrictions according to a TV, movie, application, or game rating system, specific channels, or specific programs. User profiles may be stored in a remote database allowing for various media content receiving and/or viewing devices to access the user profiles for applying parental control features according to a specific user profile. A user profile may be altered by one or more administrative users who may create an override access code which may allow the administrative user to manage other users' parental controls.

20 Claims, 10 Drawing Sheets

USER BASED PARENTAL CONTROLS

BACKGROUND

Many video content providers provide a wide array of parental controls that allow parents to control who watches or purchases certain television programs. These parental controls may be required to be set up individually on each receiver and have a simple on or off setting. While these parental controls may provide for restricting content, it may be counterproductive to parents who want unrestricted access when they watch television. For example, when a parent who wants unrestricted access to content attempts to access media content that is blocked by a parental control set up, he may be prompted for a password or personal identification number (PIN) to be entered to access the media content. Because of this hindrance, many parents may choose not to set up parental controls in the interest of convenience.

It is with respect to these and other considerations that the present invention has been made

SUMMARY

Embodiments of the present invention provide user-based parental controls. According to one embodiment, a user based parental control system may implement parental controls unique to each user set up through a sign-in user interface. For example, a user may set up a personalized user profile to sign in to access content. This content may contain restrictions due to parental controls implemented to the specific user profile.

According to another embodiment, primary users may select personalized parental controls to be applied to different users. These parental controls may have customized restrictions including, but not limited to, an age of a child, television ratings (e.g., TV-14), or other content restrictions. Another embodiment allows for the restriction of purchase programs, where only authorized users may make purchases.

According to another embodiment, powering off the device may automatically log out a parental control user. Accordingly, a next time the device is used, another log-in may be required.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to providing user-based parental controls. A user profile may be created for a user and parental control options may be displayed in order to provide unique parental controls for the user. The user may be asked to sign in before accessing content by selecting a user profile and entering a corresponding alphanumeric password.

Embodiments provide for a selection of one or more parental control options customized to a specific user profile. For example, a parental control option may include, but is not limited to, a restriction of access to content based on a TV rating system (e.g., TVY, TVPG, TV-14) or a movie rating system (e.g., PG, PG-13, R). Embodiments also allow for specific restrictions based on received information to restrict specific channels or programs from being accessed by a specific user. For example, embodiments provide for allowing a parent to block a specific program on a channel and not the channel as a whole. Another embodiment may allow for a parental control option to restrict access to purchase content, such as On-Demand movies or pay-per-view content.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
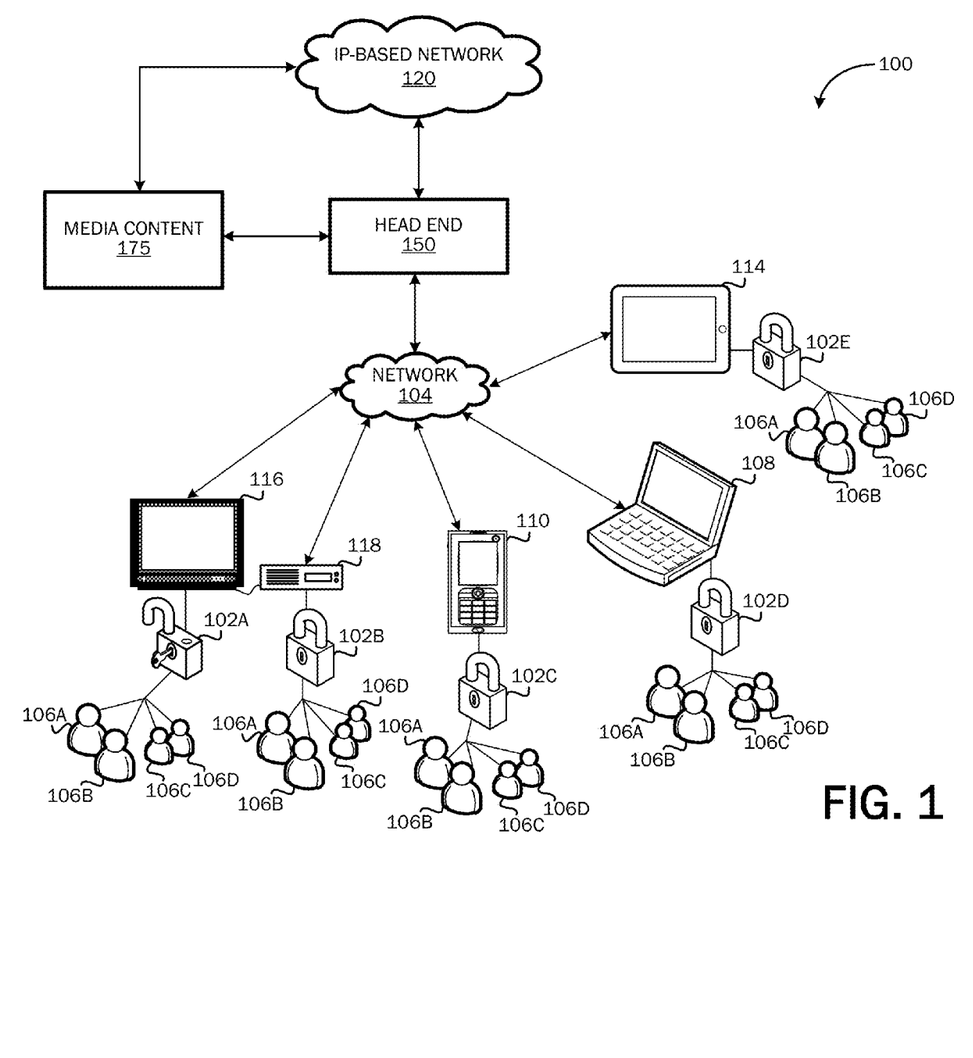
FIG. 1 is a simplified block diagram of a current parental control system.

FIG. 1 is a simplified block diagram of a current parental control system 100. As illustrated, a variety of media content receiving devices, such as but not limited to, a computing device 108, a mobile communication device 110, a tablet computing device 114, a set-top box 118, or a television 116 (including a network-connected television, such as an Internet television), may be adapted to receive media content 175. Media content 175 may include, but is not limited to, linear programming, video on demand (VOD), pay-per-view programming, video content available through a network from IP-based network 120 (e.g., the Internet) content sources, etc. A media content receiving and/or viewing device 108, 110, 114, 116, 118 may connect via various types of network architectures 104 (e.g., hybrid fiber coax (HFC), digital subscriber line (DSL), mobile network, etc.) to access an IP-based network 120 such the Internet, or to access other content (e.g., media content 175). The system 100 may include a gateway device, such as a modem for connecting one or more media content receiving and/or viewing devices 108, 110, 114, 116, 118 to a network 104,120. A variety of services may be provided through a network 104,120 including, for example, traditional digital and analog video programming, telephone services, high speed Internet access, video-on-demand, pay-per-view programming, and information services. Services may be provided or distributed by a service provider head end 150. For example, the head end 150 may include an Internet service provider (ISP), CATV services provider, cellular services provider, etc. operable to provide data (e.g., video programming, telephone services, multimedia messages, Internet data, etc.) downstream to an endpoint device and receive data upstream from an access device or gateway device.

Many service providers and media content receiving devices 108, 110, 114, 116, 118 provide a feature referred to as "parental control" 102A-E for allowing a user, such as a parent (herein referred to as an administrative user), to block certain types of content (i.e., content restrictions) from being viewed. As illustrated, parental control features 102A-E in existing systems 100 may be programmed into a media content receiving and/or viewing device 108, 110, 114, 116, 118. In an example of a set-top box (STB) 118, an administrative user may program certain channels into the STB 118 to be blocked. The administrative user may then enter an access code to prevent alteration of a blocked-channel list by users not possessing the access code. To access a blocked channel or to reprogram the blocked-channel list, a user 106A-D may be required to enter the correct access code. As can be appreciated, being required to enter an access code each time a user 106A-D wishes to access restricted content may be frustrating or annoying to the user.

Figure 2:
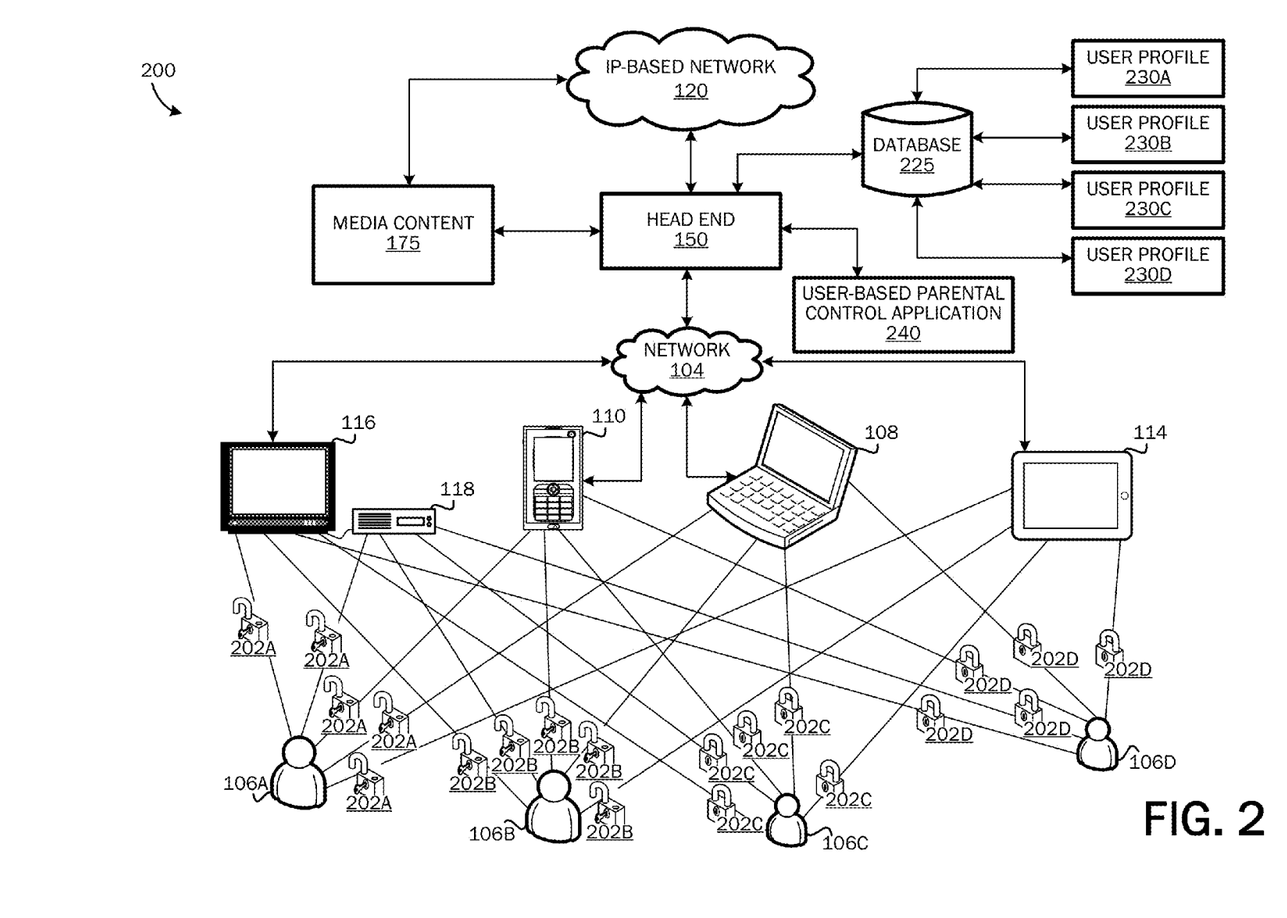
FIG. 2 is a simplified block diagram of a user-based parental control system according to embodiments.

The present invention and embodiments thereof offer an improved parental control system 200 based on user profiles 230A-D. Referring now to FIG. 2, a user-based parental control system 200 is illustrated and may include a user-based parental control application 240 for providing user-based parental controls. Although illustrated as a remote application, the user-based parental control application 240 may be stored locally on media content receiving and/or viewing devices 108, 110, 114, 116, 118. Embodiments provide parental controls 202A-D (collectively 202) to users 106A-D (collectively 106) according to a user profile 230A-D (collectively 230) associated with a specific user 106. As should be appreciated, although illustrated as including four parental controls 202A-D, users 106A-D, and user profiles 230A-D, the number of parental controls, users, and user profiles illustrated in FIG. 2 are for purposes of illustration only; embodiments are not limited to providing user-based parental controls 202 to a set number of users 106, or to receiving and storing a set number of user profiles 230, but may include varying numbers of parental controls 202, users 106, and user profiles 230.

Parental controls 202A-D may be tailored to meet a parental control need according to each user 106A-D. For example and as illustrated, an administrative user 106A, 106B, such as a parent, may have less restrictive parental controls 202A, 202B associated with his/her user profile 230A, 230B than other users 202C, 202D, such as children. User profiles 230A-D may be created by one or more administrative users 106A, 106B and may include an access code and restrictions according to a TV rating system (e.g., TVY, TVPG, TV-14), a movie rating system (e.g., PG, PG-13, R), specific channels, specific programs, movies, games, applications, or other types of media content 175, restrictions to purchase media content 175, or other types of restrictions (e.g., Internet content restrictions, etc.). User profiles 230A-D may be created for any user 106A-D of a media content receiving and/or viewing device 108, 110, 114, 116, 118. As illustrated, user profiles 230A-D may be stored in a remote database 225 allowing for various media content receiving and/or viewing devices 108, 110, 114, 116, 118 to access the user profiles 230A-D for applying parental control features 202A-D according to a specific user profile 230A-D. A user profile 230A-D may be altered by one or more administrative users 106A, 106B who may create an override PIN or access code which may allow the administrative user 106A, 106B to manage other users' 106C, 106D parental controls 202C, 202D. According to an embodiment, an access code associated with a user profile 230 may be cached or stored within a media content receiving and/or viewing devices 108, 110, 114, 116, 118 or within an application. As discussed above with respect to current parental control systems 100, being required to enter an access code each time a user 106A-D wishes to access restricted content may be frustrating or annoying to the user. Embodiments may overcome limitations of current parental control systems 100 by providing a user 106A-D with unrestricted access to allowable content (i.e., media content 175 not blocked by user profile 230A-D restrictions) once the user 106A-D enters his access code.

Figure 3:
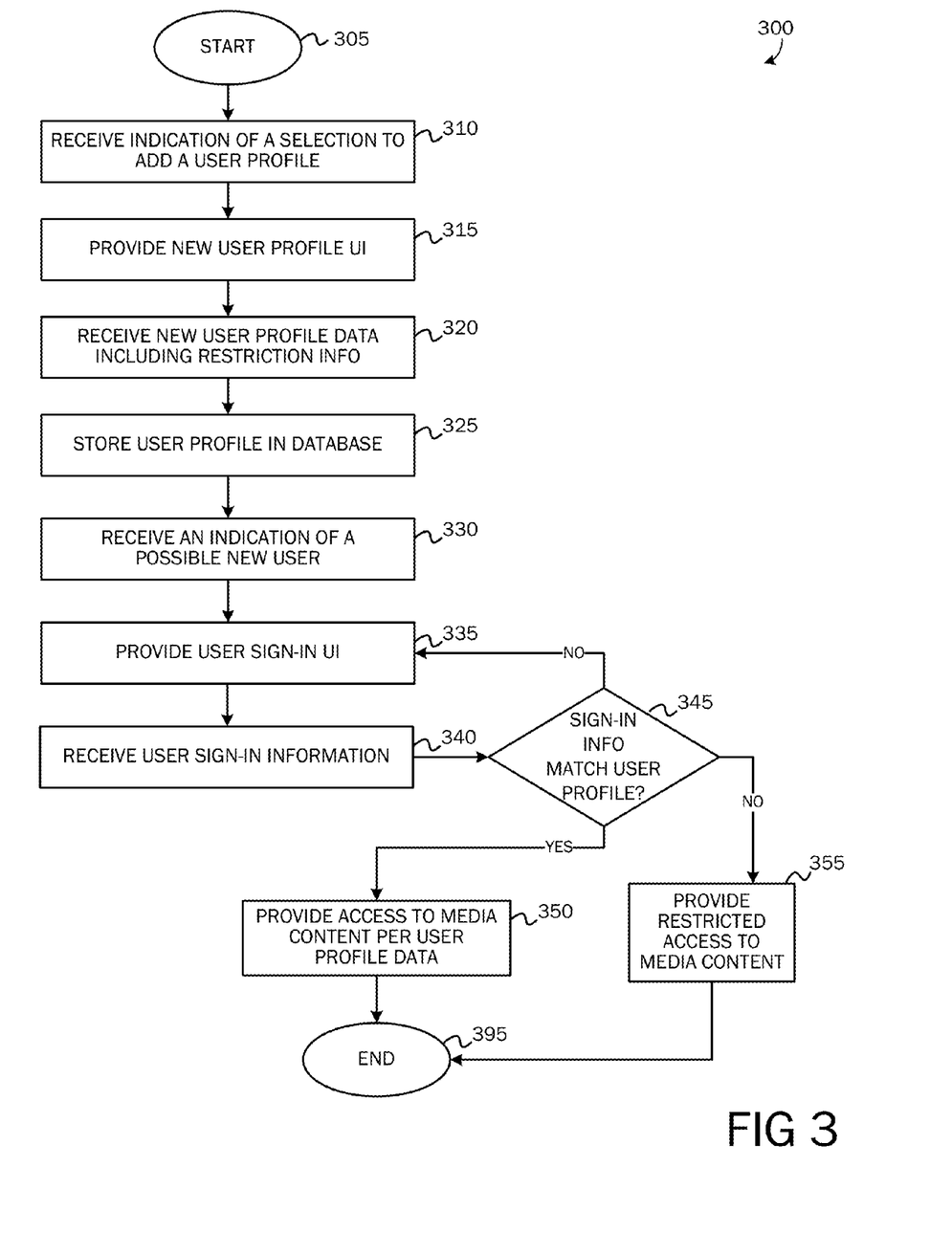
FIG. 3 is a flow chart of a method for providing user-based parental controls.
Figure 4:
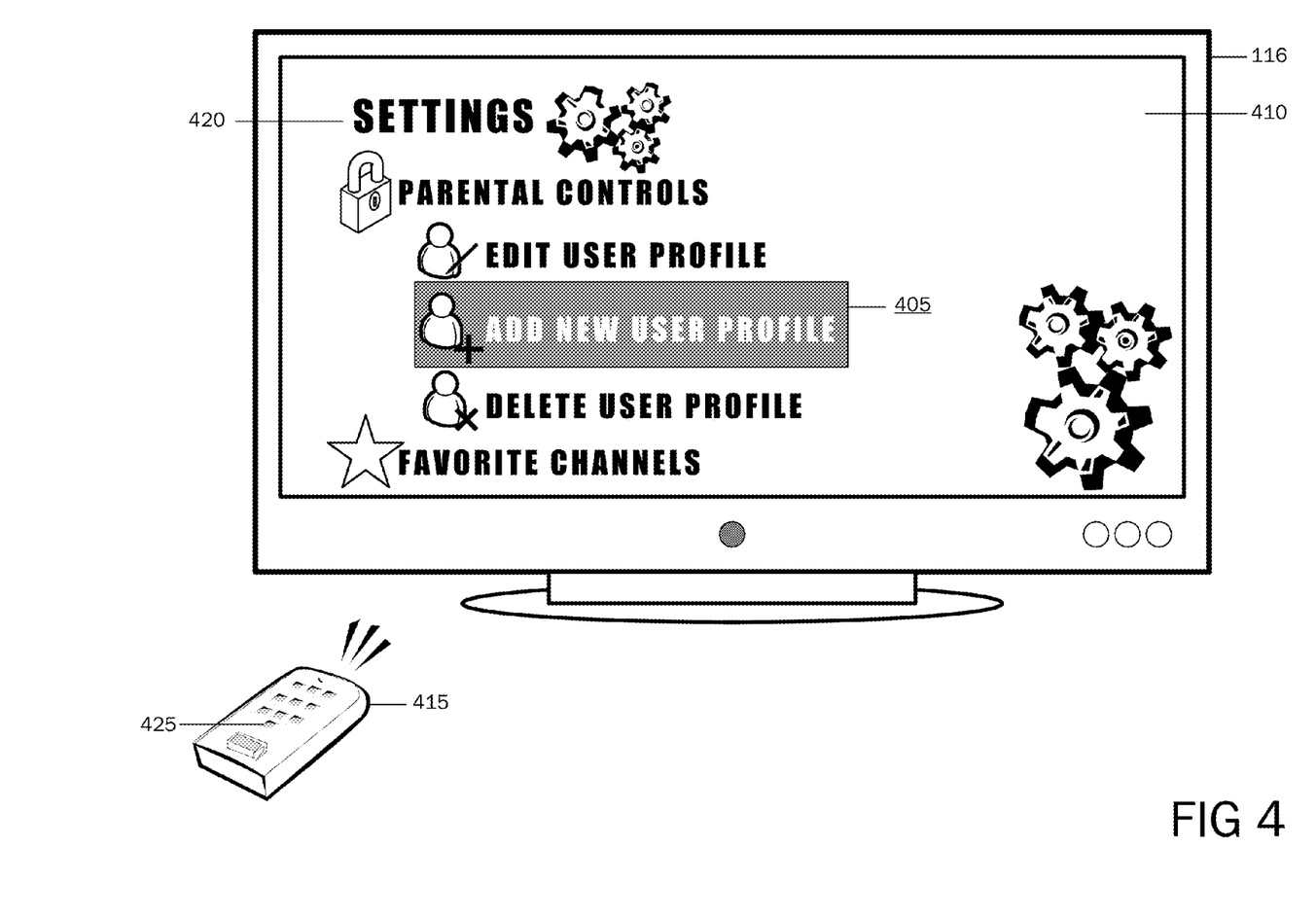
FIG. 4 is an illustration of an example new user profile user interface control displayed on a screen of a media content viewing device.

Having described an architecture of a user-based parental control system 200, FIG. 3 is a flow chart of a method 300 for providing user-based parental controls 202A-D according to an embodiment. For purposes of illustration, the process flow of method 300 will be described with reference to FIGS. 4-6B. The method 300 starts at OPERATION 305 and proceeds to OPERATION 310 where an indication of a selection to add a user profile 230A-D is received. According to embodiments and as illustrated in FIG. 4, an indication to add a user profile 230A-D may be received via various methods, for example, a selection of a "new user profile" user interface control 405 displayed on a screen 410 of a media content viewing device, such as a television 116. As should be appreciated, although illustrated as displayed on a screen 410 of a television 116, a "new user profile" user interface control 405 may be displayed on a screen 410 of other types of media content viewing devices, such as but not limited to, a computing device 108, a mobile communication device 110, or a tablet computing device 114. According to one embodiment, a "new user profile" user interface control 405 may be provided in a settings menu 420 as illustrated in FIG. 4. Other embodiments may include providing a "new user profile" user interface control 405 may be provided in other menus, in a guide, or in response to receiving a selection of a specific input (e.g., selection of a parental control button 425) via a remote control device 415 or other type of input device.

Figure 5:
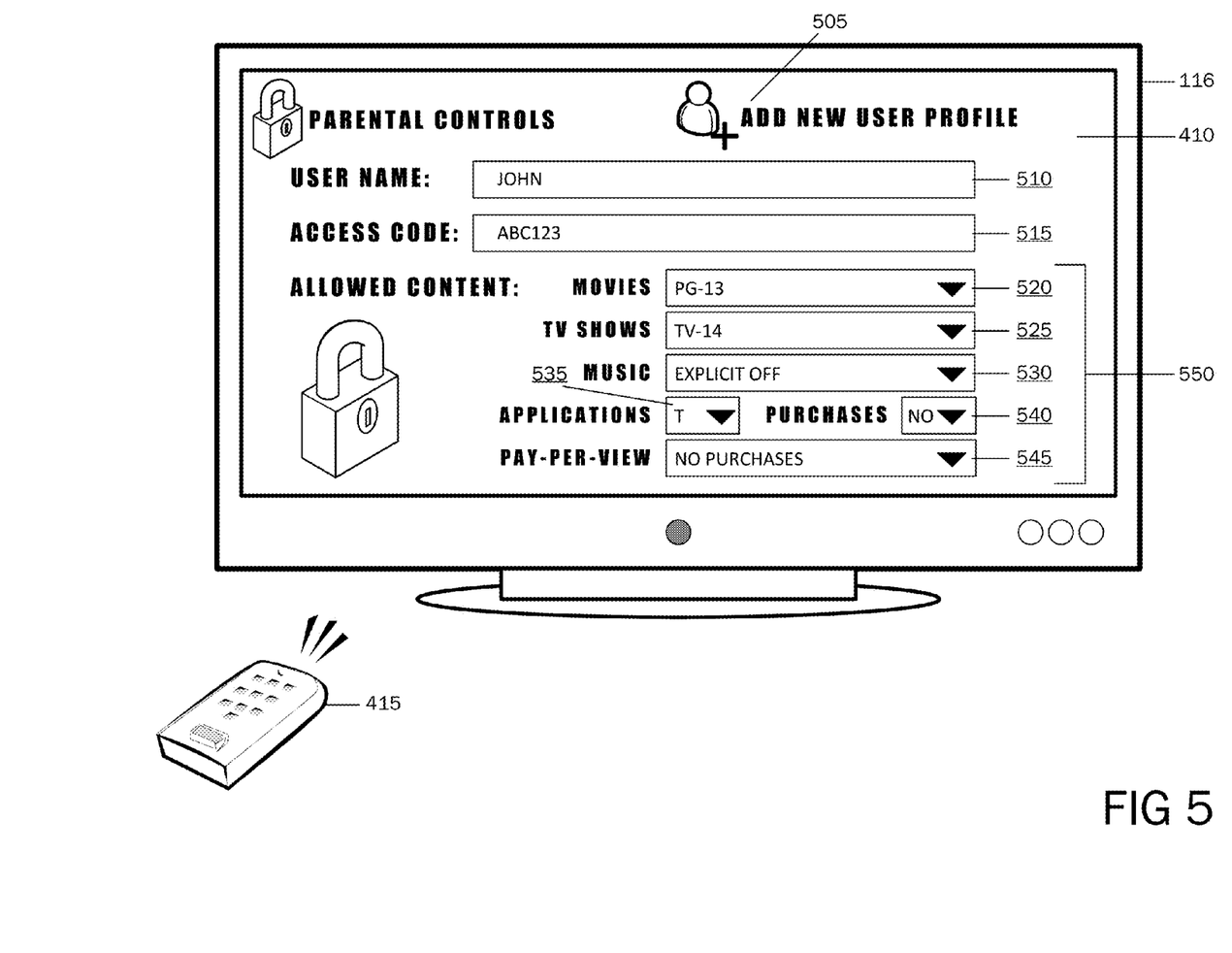
FIG. 5 is an illustration of an example new user profile user interface displayed on a screen of a media content viewing device.

With reference back to FIG. 3, upon receiving an indication of a selection to add a user profile 230, the method 300 may proceed to OPERATION 315 where a "new user profile" user interface may be provided, and then may proceed to OPERATION 320, where new user profile data, including an access code and restriction information, may be received. According to embodiments and as illustrated in FIG. 5, a "new user profile" user interface 505 may include various fields for inputting information associated with a new user profile 230 for a user 106. The "new user profile" user interface 505 may comprise one or more or a combination of a "user name" field 510 for inputting a user name for the user 106, an "access code" field 515 for inputting an access code required to be entered by a user 106 to access media content 175 allowed by his/her user profile 230, and one or more "restriction" fields 550 which may include fields 520, 525, 530, 535, 540, 545 for selecting a highest allowable level of a rating restriction option for a category of media content 175, for selecting a lowest restricted level of a rating restriction option for a category of media content 175, or for selecting an individual rating restriction option for a media content category. Restriction information may include a restricted time period to access media content 175. For example, an administrative user 106A,B may wish to restrict a user's 106C,D access to media content 175 during a certain time of the day (e.g., 9:00 PM-6:00 AM).

The example "new user profile" user interface 505 illustrated in FIG. 5 shows "restriction" fields 550 for selecting rating restriction options for categories of allowable content. The user interface 505 illustrated in FIG. 5 is but one example of various types of user interfaces 505 that may be utilized to enter or select rating restriction options. Categories of allowable content may include, but are not limited to, movies, TV shows, music, applications, purchases, pay-per-view content, specific channels, and specific programs. A "movie rating restriction option" field 520 may be provided and may include a plurality of movie rating options (e.g., G, PG, PG-13, R, NC-17, NR) from which to select a highest allowable rating. For example, if an administrative user 106A,B selects a movie rating option of PG-13, the user 106C,D for whom the new user profile 230C,D is being created may only be able to access movies (media content 175) with a rating of PG-13, PG, or G. Although not shown, a "sub-ratings option" field may be provided and may include a plurality of movie sub-ratings (e.g., FV, D, L, S, V, etc.) from which to select sub-ratings to allow or disallow. According to embodiments, movie restriction options may be presented such that each rating may be selected as allowed or disallowed individually. For example, restriction options may be provided wherein an administrative user 106A,B may restrict a user 106C,D from accessing PG13 movies, but allow the user 106C,D to access R movies.

A "TV show rating restriction option" field 525 may be provided and may include a plurality of TV rating options (e.g., TV-Y, TV-Y7, TV-G, TV-PG, TV-14, TV-MA, NR) from which to select a highest allowable rating. For example, if an administrative user 106A,B selects a TV rating option of TV-Y7, the user 106C,D for whom the new user profile 230C,D is being created may only be able to access television programming (media content 175) with a rating of TV-Y7 or TV-Y. Although not shown, a "sub-ratings option" field may be provided and may include a plurality of television sub-ratings (e.g., FV, D, L, S, V, etc.) from which to select sub-ratings to allow or disallow. According to embodiments, television restriction options may be presented such that each rating may be selected as allowed or disallowed individually. For example, restriction options may be provided wherein an administrative user 106A,B may restrict a user 106C,D from accessing TV-PG and TV-MA shows, but allow the user 106C,D to access TV-Y, TV-Y7, TV-G and TV-14 shows.

A "music rating restriction option" field 530 may be provided and may include selections to allow or disallow music with explicit lyrics. For example, if an administrative user 106A,B selects "explicit on," the user 106C,D for whom the new user profile 230C,D is being created may be allowed to access all types of music content (media content 175) including music content with explicit lyrics. Music content may also include podcasts.

An "applications rating restriction option" field 535 may be provided and may include a plurality of application rating options (e.g., EC, E, E10+, T, M17+, A18+) from which to select a highest allowable application rating. For example, if an administrative user 106A,B selects an application rating option of T, the user 106C,D for whom the new user profile 230C,D is being created may only be able to access applications (media content 175) with a rating of T, E10+, E, or EC. According to embodiments, application restriction options may be presented such that each rating may be selected as allowed or disallowed individually. For example, restriction options may be provided wherein an administrative user 106A,B may restrict a user 106C,D from accessing E10+ and A18+ applications, but allow the user 106C,D to access T and M17+ applications. An "application purchases" field 540 may be provided for allowing an administrative user 106A,B to allow or disallow purchases of applications (media content 175) to be made.

A "pay-per-view restriction option" field 545 may be provided and may include selections to allow or disallow purchasing pay-per-view content (media content 175). For example, if an administrative user 106A,B selects "no purchases," the user 106C,D for whom the new user profile 230C,D is being created may not be allowed to purchase pay-per-view content. As mentioned above, other categories of allowable or restricted content may be included, for example, a category to select specific channels, specific programs, specific actors, specific music performers, specific comedians, specific events (e.g., PPV concerts, adult programming, specific sporting events, etc.), etc. to allow or restrict.

Referring again to FIG. 3, the method 300 proceeds to OPERATION 325, where new user profile data 230 received via the "new user profile" user interface 505 is stored. According to embodiments, user profile data 230 may be stored in a database 225. According to embodiments, the database 225 may be a remote database that may be called by a head end server 150. Because user profile data 230 is stored centrally in a remote database 225, the user profile data 230 may be available across all media content receiving and/or viewing devices 108, 110, 114, 116, 118 with a connection to the database 225. According to embodiments and as described above, an access code may be cached/stored within one or more media content receiving and/or viewing devices 108, 110, 114, 116, 118 or within an application.

The method may proceed to OPERATION 330 where an indication of a possible new user 106 is received. According to an embodiment, an indication of a possible new user 106 may include an indication of a powering on of a media content receiving and/or viewing device 108, 110, 114, 116, 118. According to another embodiment, an indication of a possible new user 106 may include receiving an indication of activity following a predetermined amount of time of inactivity. According to another embodiment, an indication of a possible new user 106 may include receiving an indication of a selection of a user interface control, such as a "switch user" user interface control.

Figure 6A:
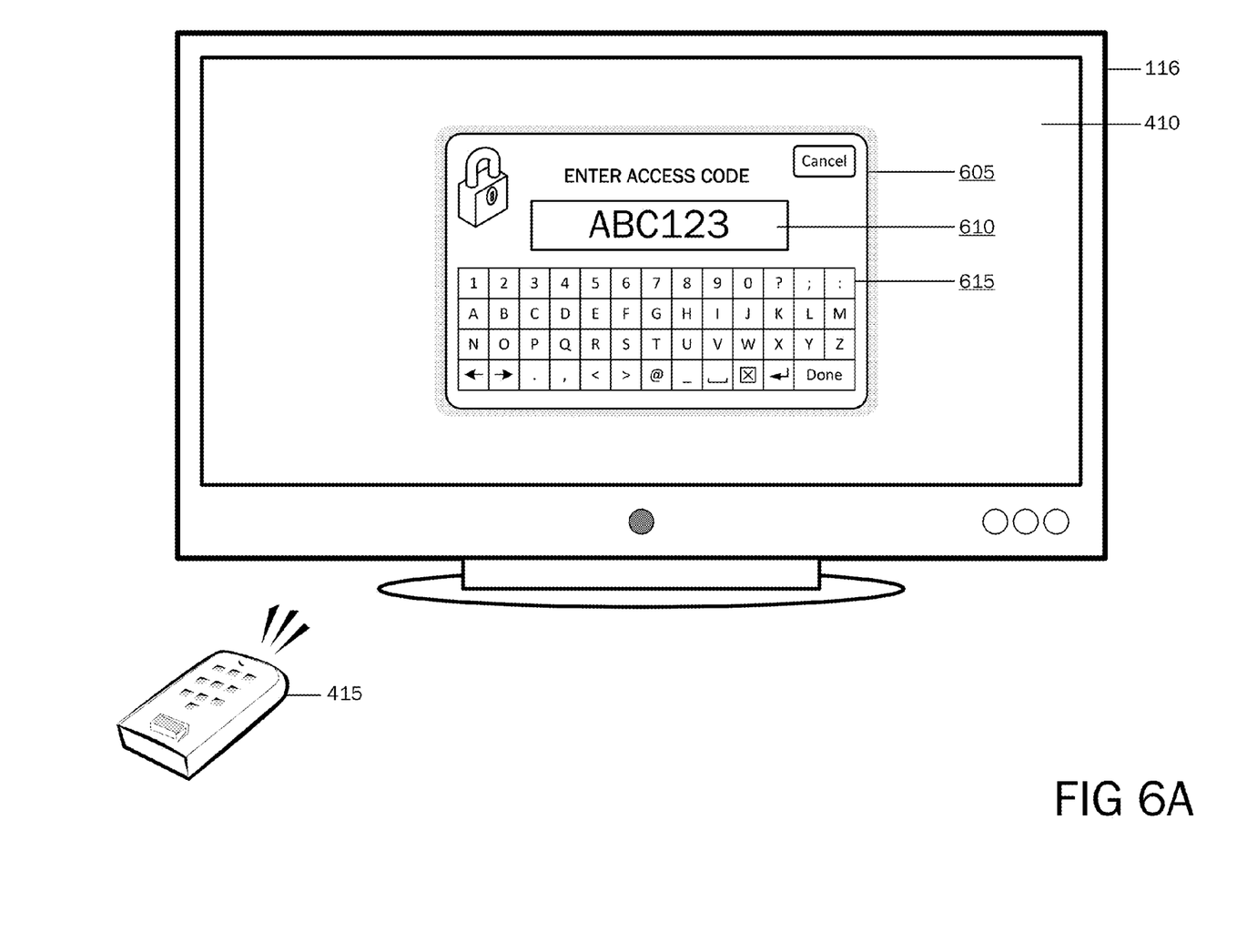
FIGS. 6A-6B are illustrations of example user sign-in user interfaces displayed on a screen of a media content viewing device.
Figure 6B:
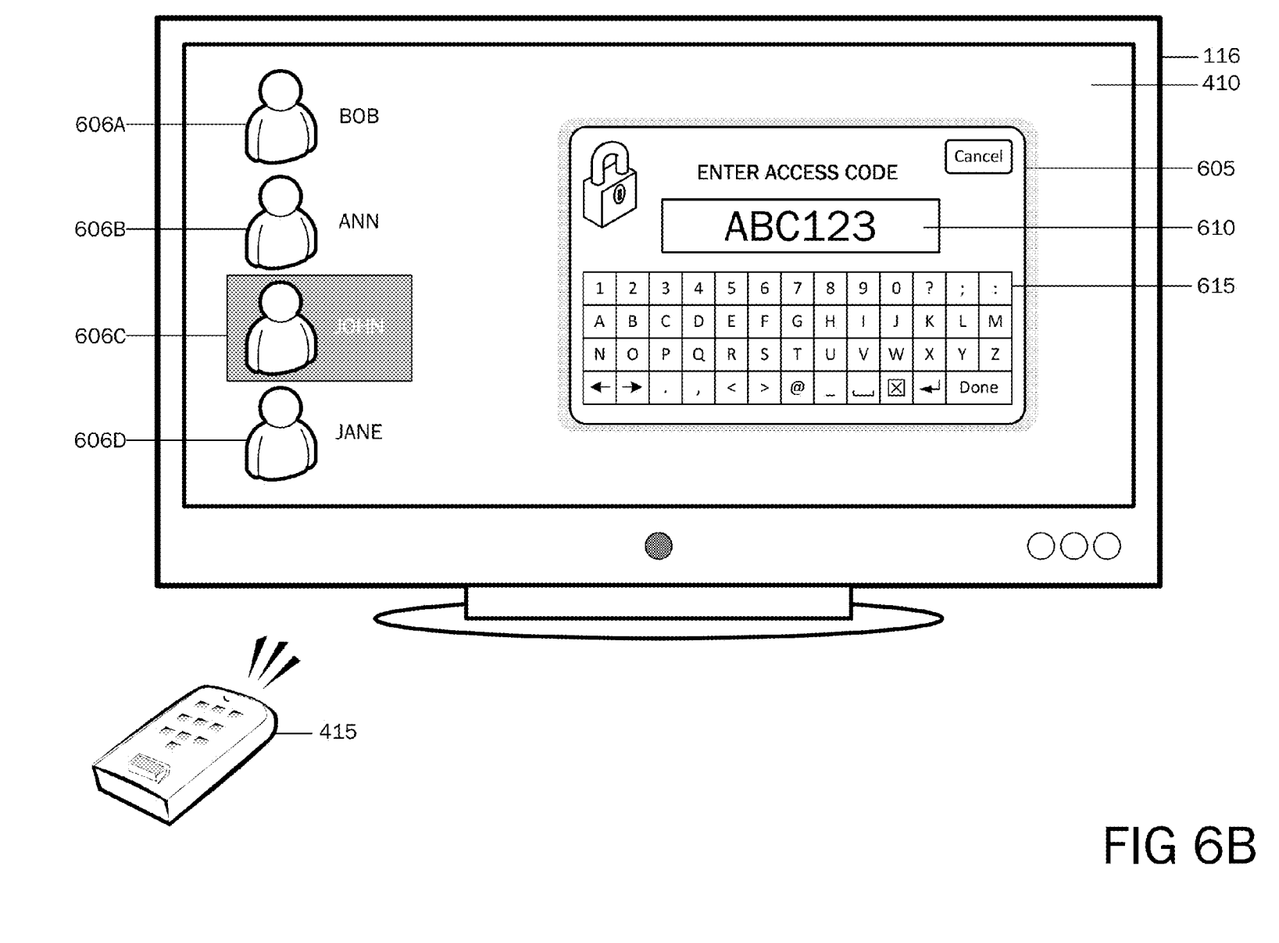

The method proceeds to OPERATION 335 where a "user sign-in" user interface (UI) 605 is provided. The "user sign-in" UI 605 may be displayed on displayed on a screen 410 of a media content viewing device, such as a television 116. As should be appreciated, although illustrated as displayed on a screen 410 of a television 116, a "user sign-in" UI 605 may be displayed on a screen 410 of other types of media content viewing devices, such as but not limited to, a computing device 108, a mobile communication device 110, or a tablet computing device 114. As illustrated in FIGS. 6A and 6B, the "user sign-in" UI 605 may include an "access code" field 610 for inputting an access code associated with a user profile 230. According to one embodiment, an on-screen keyboard 615 may be provided for selecting a combination of letters, numbers, and/or symbols. According to an embodiment, and as illustrated in FIG. 6B, a user 106 may be required to select or enter a username 606 prior to entering the access code.

Referring back to FIG. 3, the method proceeds to OPERATION 340 where user sign-in information is received. As stated above, user sign-in information may include receiving a selection or input of a username 606 and/or an input of an access code associated with a user profile 230.

After receiving user sign-in information, the method 300 proceeds to DECISION OPERATION 345 where a determination is made whether the received user sign-in information matches a username 606 and/or access code of a user profile 230. According to embodiments, if a media content receiving/viewing device 108, 110, 114, 116, 118 with which a user is using is connected to a network and can access the database 225, the user sign-in information may be compared with user profile data 230 stored in the database 225. If the receiving/viewing device 108, 110, 114, 116, 118 is not connected to a network and cannot access the database 225, the user sign-in information may be compared with access codes cached/stored within the device or in an application. For example, if a user is using a tablet computing device 114 that is not connected to the Internet or other network and the user wants to access stored media content 175 (e.g., a movie, game, application, etc. stored on the device 114), the access code cached/stored within the device 114 or in application on the device 114 may be active to access the media content 175.

If a match is not found, according to one embodiment, the method 300 may repeat to OPERATION 335 where the "user sign-in" UI 605 may be redisplayed on the screen 410 of the media content viewing device 108, 110, 114, 116, 118. According to another embodiment, the method 300 may proceeds to OPERATION 355 where restricted access to media content 175 may be provided. For example, restricted access to media content 175 may include applying restrictions according to a highest-restricted user profile 230 associated with a service account. Restricted access to media content 175 may also include restricting any purchases of pay-per-view content, applications, games, etc.

If at DECISION OPERATION 345 a match is found, the method 300 may proceed to OPERATION 350 where access to media content 175 according to restriction information associated with the matched user profile 230 is provided. According to one embodiment, restricted media content may be omitted from the program guide. According to another embodiment, restricted media content may be displayed in a program guide but may not be selectable.

Override features may be provided. For example, if a user's 106C,D user profile 230C,D includes a movie rating option of PG-13, but an administrative user 106A,B wants to allow the user 106C,D to access R-rated movie content (media content 175), the administrative user 106A,B may enter a predetermined access code to allow access to restricted content. The method 300 ends at OPERATION 395.

Figure 7:
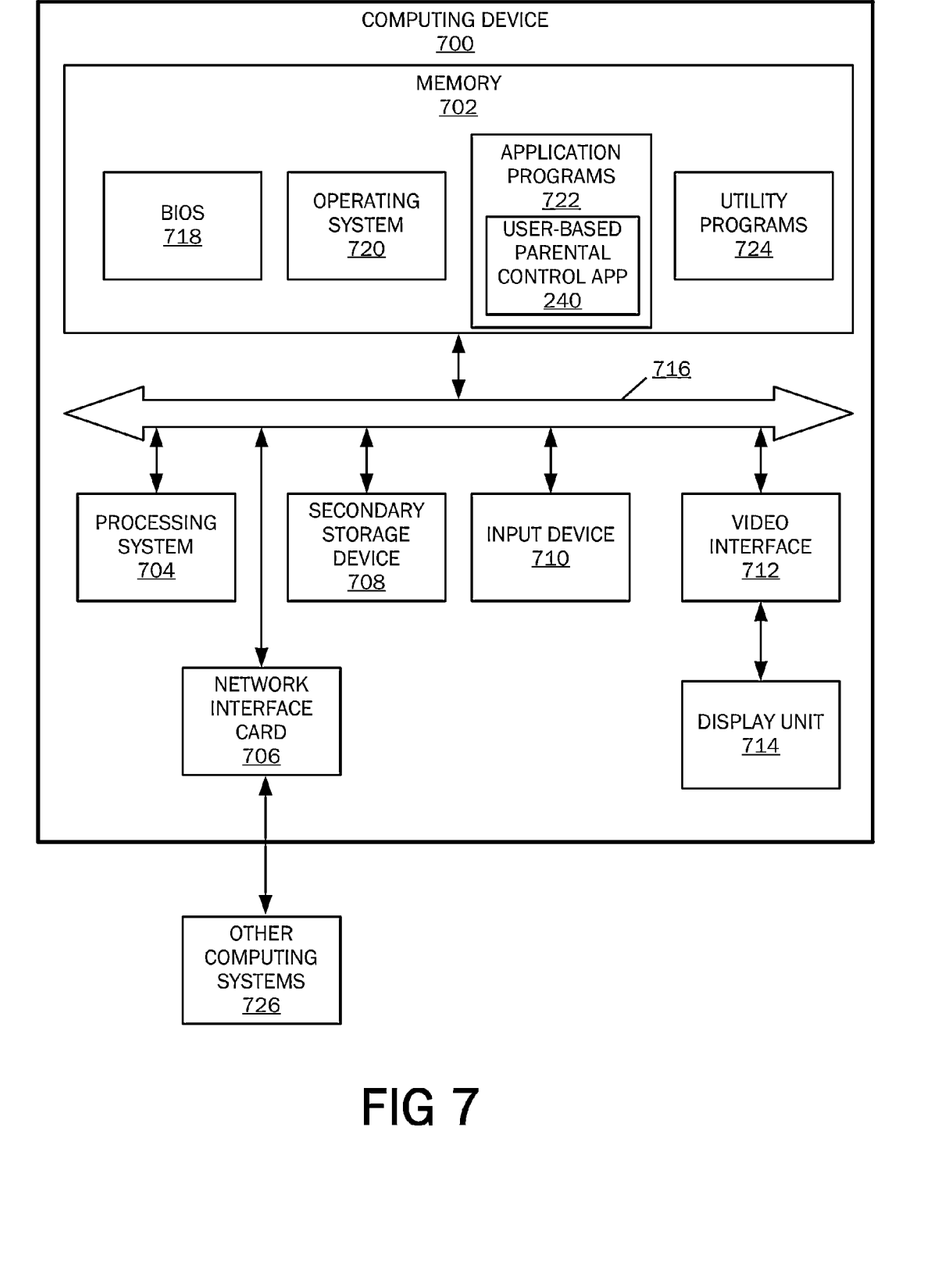
FIG. 7 is a simplified block diagram illustrating example physical components of a computing device with which embodiments may be practiced.

FIG. 7 is a simplified block diagram illustrating example physical components of a computing device 700 with which embodiments may be practiced. In some embodiments, one or a combination of the components 150, 225, 230 of system 200 may be implemented using one or more computing devices like the computing device 700. It should be appreciated that in other embodiments, components 150, 225, 230 of system 200 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the user based parental control application 240 may be stored locally on computing device 700. Memory 702 thus may store the computer-executable instructions that, when executed by processor 704, cause a user-based parental control application 240 to provide user-based parental controls 202 as described above with reference to FIGS. 1-6.

In various embodiments, the memory 702 is implemented in various ways.

For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the user-based parental control application 240. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

Figure 8A:
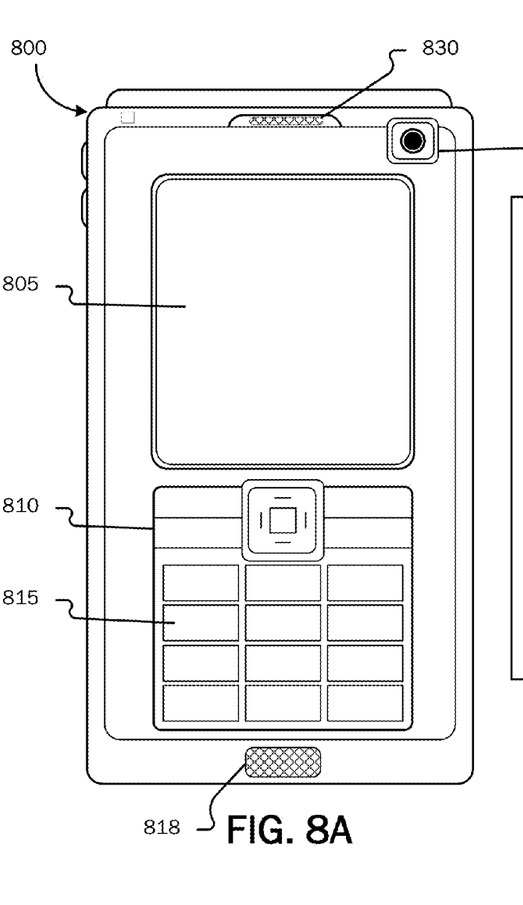
FIGS. 8A and 8B illustrate a suitable mobile computing environment with which embodiments may be practiced.
Figure 8B:
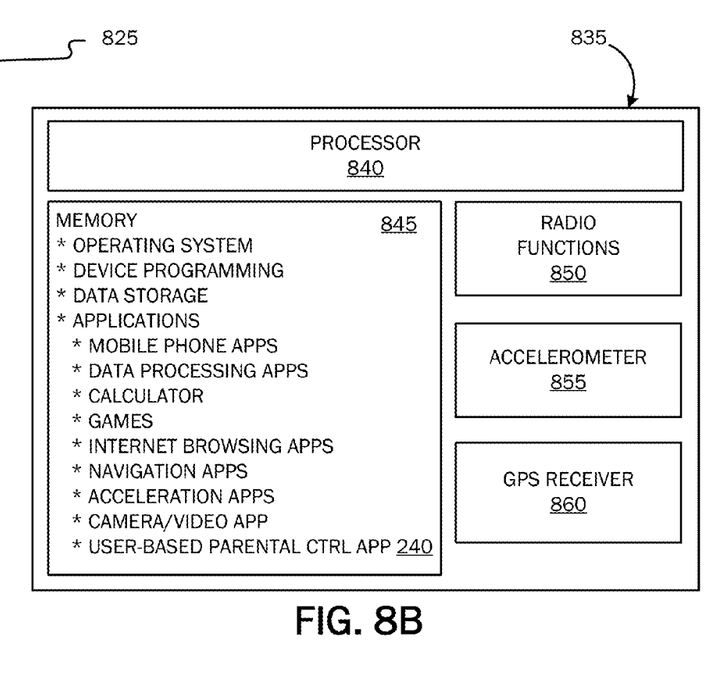

FIGS. 8A-B illustrate a suitable mobile computing environment, for example, a mobile computing device 110, a smart phone, a tablet personal computer 114, a laptop computer 108, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the user-based parental control application 240 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Figure 9:
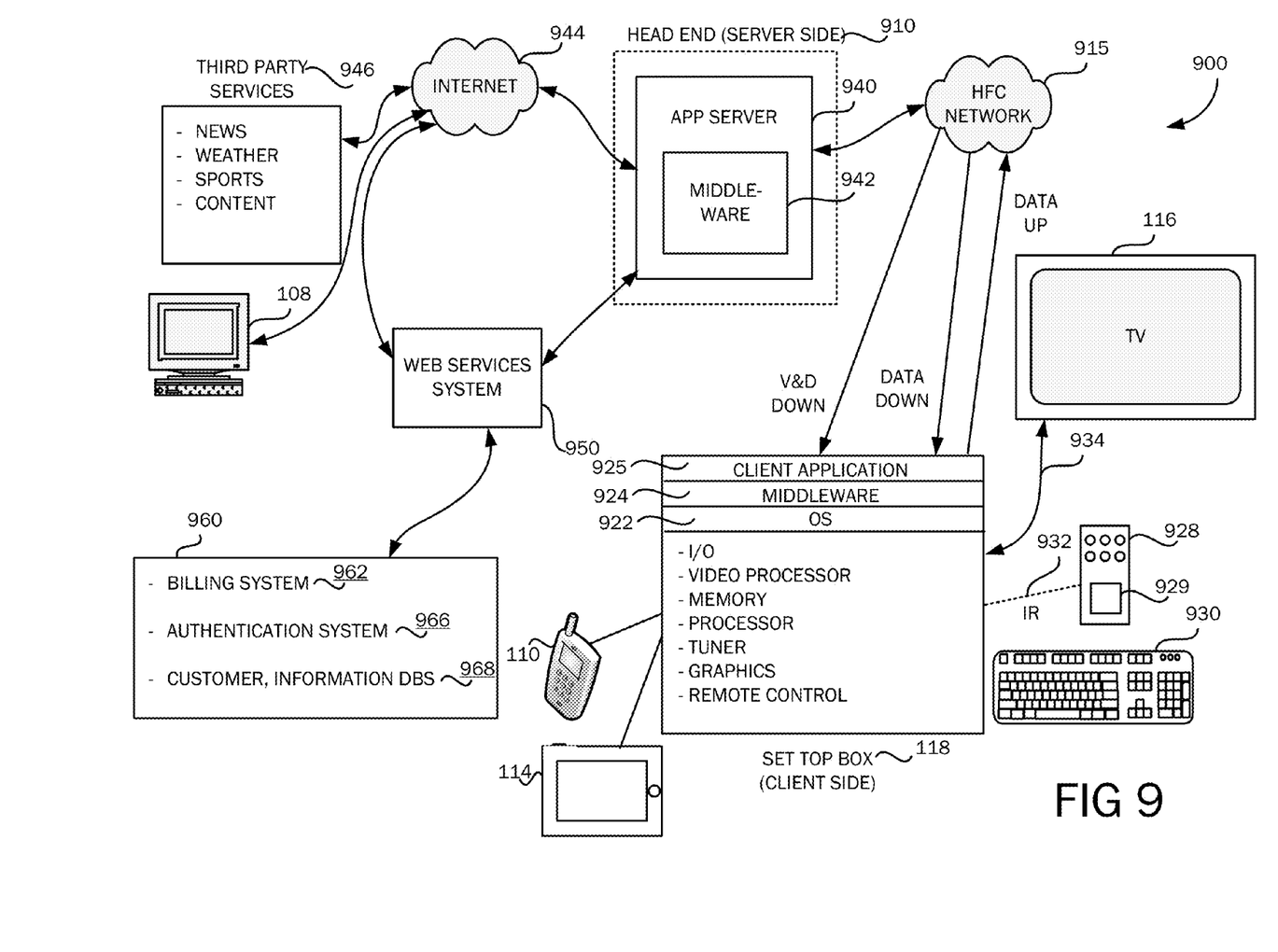
FIG. 9 is a simplified block diagram illustrating a cable television services system architecture providing an operating environment according to an embodiment.

FIG. 9 is a simplified block diagram illustrating a cable television services system 900 (hereafter referred to as "CATV") architecture providing an operating environment according to an embodiment. As should be appreciated, a CATV services system 900 is but one of various types of systems that may be utilized for providing an operating environment for providing user-based parental controls 202. Referring now to FIG. 9, digital and analog video programming, information content and interactive television services are provided via a hybrid fiber coax (HFC) network 915 to a television set 116 for consumption by a cable television/services system customer. As is known to those skilled in the art, HFC networks 915 combine both optical fiber and coaxial cable lines. Typically, optical fiber runs from the cable head end 910 to neighborhoods of subscribers. Coaxial cable runs from the optical fiber feeders to each customer or subscriber. The functionality of the HFC network 915 allows for efficient bidirectional data flow between the client-side set-top box 118 and the server-side application server 940 of the embodiment.

The CATV system 900 is in the form of a distributed client-server computing system for providing video and data flow across the HFC network 915 between server-side services providers (e.g., cable television/services providers) via a server-side head end 910 and a client-side customer via a client-side set-top box (STB) 118 functionally connected to a customer receiving device, such as the television set 116. As is understood by those skilled in the art, modern CATV systems 900 may provide a variety of services across the HFC network 915 including traditional digital and analog video programming, telephone services, high speed Internet access, video-on-demand, and information services.

On the client side of the CATV system 900, digital and analog video programming and digital and analog data are provided to the customer television set 116 via the set-top box (STB) 118. Interactive television services that allow a customer to input data to the CATV system 900 likewise are provided by the STB 118. As illustrated in FIG. 9, the STB 118 is a multipurpose computing device having a computer processor, memory, and an input/output mechanism. The input/output mechanism receives input from server-side processes via the HFC network 915 and from customers via input devices such as the remote control device 928, keyboard 930, or other computing device, such as a tablet/slate computer 114, smart phone 110, etc. The remote control device 928 and the keyboard 930 may communicate with the STB 118 via a suitable communication transport such as the infrared connection 932. The remote control device 928 may include a biometric input module 929. The STB 118 also includes a video processor for processing and providing digital and analog video signaling to the television set 116 via a cable communication transport 934. A multi-channel tuner is provided for processing video and data to and from the STB 118 and the server-side head end system 910, described below.

The STB 118 also includes an operating system 922 for directing the functions of the STB 118 in conjunction with a variety of client applications 925. For example, if a client application 925 requires a news flash from a third-party news source to be displayed on the television 116, the operating system 922 may cause the graphics functionality and video processor of the STB 118, for example, to output the news flash to the television 116 at the direction of the client application 925 responsible for displaying news items.

Because a variety of different operating systems 922 may be utilized by a variety of different brands and types of set-top boxes, a middleware layer 924 may be provided to allow a given software application to be executed by a variety of different operating systems. According to an embodiment, the middleware layer 924 may include a set of application programming interfaces (APIs) that are exposed to client applications 925 and operating systems 922 that allow the client applications to communicate with the operating systems through common data calls understood via the API set. As described below, a corresponding middleware layer is included on the server side of the CATV system 900 for facilitating communication between the server-side application server and the client-side STB 118. The middleware layer 942 of the server-side application server and the middleware layer 924 of the client-side STB 118 may format data passed between the client side and server side according to the Extensible Markup Language (XML).

According to one embodiment, the set-top box 118 passes digital and analog video and data signaling to the television 116 via a one-way communication transport 934. According to other embodiments, two-way communication transports may be utilized, for example, via high definition multimedia (HDMI) ports. The STB 118 may receive video and data from the server side of the CATV system 900 via the HFC network 915 through a video/data downlink and data via a data downlink. The STB 118 may transmit data from the client side of the CATV system 900 to the server side of the CATV system 900 via the HFC network 915 via one data uplink. The video/data downlink is an "in band" downlink that allows for digital and analog video and data signaling from the server side of the CATV system 900 through the HFC network 915 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 9, between the HFC network 915 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 940 is typically passed through the "out of band" data links. Alternatively, an "in band" data carousel may be positioned in an "in band" channel into which a data feed may be processed from the server-side application server 940 through the HFC network 915 to the client-side STB 118. Operation of data transport between components of the CATV system 900, described with reference to FIG. 9, is well known to those skilled in the art.

Referring still to FIG. 9, the head end 910 of the CATV system 900 is positioned on the server side of the CATV system and includes hardware and software systems responsible for originating and managing content for distributing through the HFC network 915 to client-side STBs 118 for presentation to customers via televisions 116. As described above, a number of services may be provided by the CATV system 900, including digital and analog video programming, interactive television services, telephone services, video-on-demand services, targeted advertising, and provision of information content.

The application server 940 is a general-purpose computing system operative to assemble and manage data sent to and received from the client-side set-top box 118 via the HFC network 915. As described above with reference to the set-top box 118, the application server 940 includes a middleware layer 942 for processing and preparing data from the head end of the CATV system 900 for receipt and use by the client-side set-top box 118. For example, the application server 940 via the middleware layer 942 may obtain data from third-party services 946 via the Internet 944 for transmitting to a customer through the HFC network 915 and the set-top box 118. For example, content metadata a third-party content provider service may be downloaded by the application server via the Internet 944. When the application server 940 receives the downloaded content metadata, the middleware layer 942 may be utilized to format the content metadata for receipt and use by the set-top box 118. Therefore, content metadata may be sent and categorized based on the availability to the customer's program guide data.

According to one embodiment, data obtained and managed by the middleware layer 942 of the application server 940 is formatted according to the Extensible Markup Language and is passed to the set-top box 118 through the HFC network 915 where the XML-formatted data may be utilized by a client application 925 in concert with the middleware layer 924, as described above. As should be appreciated by those skilled in the art, a variety of third-party services data, including news data, weather data, sports data and other information content may be obtained by the application server 940 via distributed computing environments such as the Internet 944 for provision to customers via the HFC network 915 and the set-top box 118. According to embodiments, client application 940 may include the user-based parental control application 240 described herein.

According to embodiments, the application server 940 obtains customer support services data, including billing data, information on customer work order status, answers to frequently asked questions, services provider contact information, and the like from data services 960 for provision to the customer via an interactive television session. As illustrated in FIG. 9, the services provider data services 960 include a number of services operated by the services provider of the CATV system 900 which may include data on a given customer.

A billing system 962 may include information such as a customer's name, street address, business identification number, Social Security number, credit history, and information regarding services and products subscribed to by the customer. According to embodiments, the billing system 962 may also include billing data for services and products subscribed to by the customer for bill processing, billing presentment and payment receipt.

A customer information database 968 may include general information about customers such as place of employment, business address, business telephone number, and demographic information such as age, gender, educational level, and the like. The customer information database 968 may also include information on pending work orders for services or products ordered by the customer. The customer information database 968 may also include general customer information such as answers to frequently asked customer questions and contact information for various service provider offices/departments. As should be understood, this information may be stored in a variety of disparate databases operated by the cable services provider.

Referring still to FIG. 9, web services system 950 is illustrated between the application server 940 and the data services 960. According to embodiments, web services system 950 serves as a collection point for data requested from each of the disparate data services systems comprising the data services 960. According to embodiments, when the application server 940 requires customer services data from one or more of the data services 960, the application server 940 passes a data query to the web services system 950. The web services system formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above.

An authentication system 966 may include information such as secure user names, subscriber profiles, subscriber IDs, and passwords utilized by customers for access to network services. As should be understood by those skilled in the art, the disparate systems 950, 962, 966, 968 may be integrated or provided in any combination of separate systems, wherein FIG. 9 shows only one example.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-9. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for providing user-based parental controls, the method comprising:
   receiving media content restriction information and sign-in information associated with a user of a plurality of users wherein the plurality of users and a plurality of media content receiving and/or viewing devices are associated with an account;
   for each user of the plurality of users, storing a user profile including sign-in information and the media content restriction information in a centralized database, wherein the sign-in information includes a user name and access code, wherein the media content restriction information includes a user specific restriction level for movies, tv shows, music, applications and purchases;
   providing a user sign-in user interface on one of the media content receiving and/or viewing devices;
   receiving user sign-in information into the user sign-in user interface;
   determining whether the received user sign-in information received into the user sign-in user interface on the one media content receiving and/or viewing device matches sign-in information associated with a stored user profile for one of the plurality of users by comparing the received user sign-in information with the sign-in information associated with a stored user profile for one of the plurality of users;
   if the received user sign-in information matches sign-in information associated with a stored user profile for one of the plurality of users, making the user profile for the user available to the plurality of media content receiving and/or viewing devices and providing the user access to media content on the plurality of media content receiving and/or viewing devices according to the received media content restriction information without requiring user sign-in information; and
   if the received user sign-in information does not match sign-in information associated with a stored user profile for any of the plurality of users, making the user profiles for the plurality of users available to the plurality of media content receiving and/or viewing devices and providing the user access to media content on the plurality of media content receiving and/or viewing devices according to the media content restriction information for the highest-restricted user profile associated with the account.

2. The method of claim 1, wherein receiving sign-in information associated with a user comprises receiving a username and access code.

3. The method of claim 1, wherein prior to receiving media content restriction information and sign-in information associated with a user, providing a new user profile user interface.

4. The method of claim 1, wherein receiving media content restriction information for music comprises receiving an indication of allowing or disallowing explicit lyrics.

5. The method of claim 1, wherein receiving media content restriction information comprises receiving a selection of whether one or more applications or pay-per-view content may be purchased by the user.

6. The method of claim 1, wherein receiving media content restriction information comprises receiving an input of one or more of:
   a selection of a restricted channel;
   a selection of a restricted program;
   a selection of a restricted actor;
   a selection of a restricted performer;
   a selection of a restricted sporting event; or
   a selection of a restricted time period.

7. The method of claim 1, wherein receiving media content restriction information comprises receiving one or more of:
   a highest allowable level of a rating restriction option;
   a lowest restricted level of a rating restriction option;
   a selection of an allowed rating restriction option; or
   a selection of a restricted rating restriction option.

8. The method of claim 7, wherein receiving media content restriction information comprises receiving a highest allowable level of a rating restriction option, a lowest restricted level of a rating restriction option, a selection of an allowed rating restriction option, or a selection of a restricted rating restriction option based on one or more of movie rating options G, PG, PG-13, R, NC-17, or NR.

9. The method of claim 7, wherein receiving media content restriction information comprises receiving a highest allowable level of a rating restriction option, a lowest restricted level of a rating restriction option, a selection of an allowed rating restriction option, or a selection of a restricted rating restriction option based on one or more of television show rating options TV-Y, TV-Y7, TV-G, TV-PG, TV-14, TV-MA, or NR.

10. The method of claim 7, wherein receiving media content restriction information comprises receiving a highest allowable level of a rating restriction option, a lowest restricted level of a rating restriction option, a selection of an allowed rating restriction option, or a selection of a restricted rating restriction option based on one or more of application rating options: early childhood, everyone, everyone 10+, teen, mature 17+, and adults only 19+.

11. The method of claim 1, wherein providing a user sign-in user interface includes providing a user sign-in user interface after receiving an indication one of:
   a powering on of a media content receiving and/or viewing device;
   activity following a predetermined amount of time of inactivity; or
   a selection of a switch user interface control.

12. A system for providing user-based parental controls, the system comprising:
   a memory storage; and
   a processing unit coupled to the memory storage, wherein the processing unit is operable to:
      receive media content restriction information and sign-in information associated with a user of a plurality of users wherein the plurality of users and a plurality of media content receiving and/or viewing devices are associated with an account;
      for each of the plurality of users, store a user profile including the sign-in information and the media content restriction information, wherein the sign-in information includes a user name and access code, wherein the media content restriction information includes a user specific restriction level for movies, tv shows, music, applications and purchases;
      provide a user sign-in user interface on one of the media content receiving and/or viewing devices;
      receive user sign-in information into the user sign-in user interface;
      determine whether the received user sign-in information matches sign-in information associated with a stored user profile for one of the plurality of users;
      if the received user sign-in information received into the user sign-in user interface matches sign-in information associated with a stored user profile for one of the plurality of users by comparing the received user sign-in information with the sign-in information associated with a stored user profile for one of the plurality of users, make the user profile for the user available to the plurality of media content receiving and/or viewing devices and provide the user access to media content according to the received media content restriction information without requiring user sign-in information; and if the received user sign-in information does not match sign-in information associated with a stored user profile for any of the plurality of users, make the user profiles for the plurality of users available to the plurality of media content receiving and/or viewing devices and provide the user access to media content according to the media content restriction information for a highest restricted user profile associated with the account.

13. The system of claim 12, wherein a user profile including the media content restriction information is stored in a centralized database.

14. The system of claim 12, wherein the processing unit is further operable to store an access code associated with a user profile on a local media content receiving/viewing device.

15. The system of claim 12, wherein media content restriction information associated with a user comprises one of:
a highest allowable level of a rating restriction option;
a lowest restricted level of a rating restriction option;
a selection of an allowed rating restriction option; or
a selection of a restricted rating restriction option.

16. The system of claim 12, wherein media content restriction information associated with a user comprises a selection of a rating restriction option associated with one or more of:
pay-per-view content;
a specific channel;
a specific program;
a specific actor;
a specific performer;
a specific sporting type or event; or
a restricted time period.

17. A computer readable storage device not including a signal having computer-executable instructions for providing user-based parental controls, comprising:
providing a new user profile user interface;
receiving media content restriction information and sign-in information associated with a user of a plurality of users wherein the plurality of users and a plurality of media content receiving and/or viewing devices are associated with an account;
for each of the plurality of users, storing a user profile including the sign-in information and the media content restriction information in a centralized database, wherein the sign-in information includes a user name and access code, wherein the media content restriction information includes a user specific restriction level for movies, tv shows, music, applications and purchases;
providing a user sign-in user interface after receiving an indication one of:
a powering on of a media content receiving and/or viewing device;
activity following a predetermined amount of time of inactivity; or
a selection of a switch user interface control;
receiving user sign-in information into the user sign-in user interface;
determining whether the received user sign-in information received into the user sign-in user interface on one of the media content receiving and/or viewing devices matches sign-in information associated with a stored user profile for one of the plurality of users by comparing the received user sign-in information with the sign-in information associated with a stored user profile for one of the plurality of users;
if the received user sign-in information matches sign-in information associated with a stored user profile for one of the plurality of users, making the user profile for the user available to the plurality of media content receiving and/or viewing devices and providing the user access to media content on the plurality of media content receiving and/or viewing devices according to the received media content restriction information without requiring user sign-in information; and
if the received user sign-in information does not match sign-in information associated with a stored user profile for any of the plurality of users, making the user profiles for the plurality of users available to the plurality of media content receiving and/or viewing devices and providing the user access to media content on the plurality of media content receiving and/or viewing devices according to the media content restriction information for a highest restricted level according to stored user profiles associated with the account.

18. The computer readable storage device of claim 17, wherein receiving sign-in information associated with a user comprises receiving a username and access code.

19. The computer readable storage device of claim 17, wherein restricted media content is omitted from the program guide.

20. The computer readable storage device of claim 17, wherein media content restriction information associated with a user comprises a selection of a rating restriction option associated with one or more of:
pay-per-view content;
a specific channel;
a specific program;
a specific actor;
a specific performer;
a specific sporting type or event; or
a restricted time period.

* * * * *